(12) United States Patent
Gauthier et al.

(10) Patent No.: US 8,771,549 B2
(45) Date of Patent: Jul. 8, 2014

(54) CHEMICAL LOOPING COMBUSTION METHOD AND PLANT WITH INDEPENDENT SOLID CIRCULATION CONTROL

(75) Inventors: Thierry Gauthier, Brignais (FR); Ali Hoteit, Puteaux (FR); Ann Forret, Longes (FR)

(73) Assignees: IFP Energies Nouvelles, Rueil-Malmaison (FR); Total SA, Courbevoie (FR)

( * ) Notice: Subject to any disclaimer, the term of this patent is extended or adjusted under 35 U.S.C. 154(b) by 93 days.

(21) Appl. No.: 13/383,890

(22) PCT Filed: Jun. 30, 2010

(86) PCT No.: PCT/FR2010/000476
§ 371 (c)(1),
(2), (4) Date: Mar. 2, 2012

(87) PCT Pub. No.: WO2011/007055
PCT Pub. Date: Jan. 20, 2011

(65) Prior Publication Data
US 2012/0148484 A1 Jun. 14, 2012

(30) Foreign Application Priority Data

Jul. 16, 2009 (FR) ...................... 09 03502

(51) Int. Cl.
*C01B 3/38* (2006.01)
*C01B 3/24* (2006.01)

(52) U.S. Cl.
USPC ......................................... 252/373; 423/650

(58) Field of Classification Search
USPC ....................................................... 252/373
See application file for complete search history.

(56) References Cited

U.S. PATENT DOCUMENTS

| 3,969,089 A | 7/1976 | Moss et al. |
| 5,341,766 A * | 8/1994 | Hyppanen ..................... 122/4 D |
| 5,735,682 A * | 4/1998 | Toth ............................. 431/170 |
| 2011/0174203 A1* | 7/2011 | Salatino et al. ............... 110/245 |

FOREIGN PATENT DOCUMENTS

| FR | 2 850 156 A1 | 7/2004 |
| FR | 2 895 413 A1 | 6/2007 |
| JP | 10-300020 | 11/1998 |
| JP | 11-148609 | 6/1999 |

OTHER PUBLICATIONS

T.M. Knowlton, Standpipes and Nonmechanical Valves, Particulate Solid Research Inc., pp. 571-597.
A. Lyngfelt et al., Chemical-Looping Combustion, Status of Development, Chamlers University Technology, pp. 39-53.
Mohammad Hossain, et al., Chemical-Looping Combustion (CLC) for Inherent $CO_2$ Separations—A Review, Chemical Engineering Science, 63, 2008, pp. 4433-4451.
W. Nowak et al., Operation Experience of Large-Scale Circulating Fluidized Bed Boilers for Power Generation, IFSA 2008, Johannesburg, South Africa Institute of Mining and Metallurgy, pp. 25-33.
Gauthier, R & D Fluidized Bed processes in the Refining Industry, IFSA 2008, Johannesburg, South Africa Institute of Mining and Metallurgy, pp. 35-87.

* cited by examiner

Primary Examiner — Melvin C Mayes
Assistant Examiner — Kenneth Vaden
(74) Attorney, Agent, or Firm — Antonelli, Terry, Stout & Kraus, LLP.

(57) ABSTRACT

The invention relates to an improved plant and method for chemical looping combustion of at least one hydrocarbon feed with independent control of the circulation of the solid active mass particles between the fluidized bed reaction zones, by means of one or more non-mechanical valves of L-valve type.

16 Claims, 10 Drawing Sheets

Prior Art

CHEMICAL LOOPING COMBUSTION METHOD AND PLANT WITH INDEPENDENT SOLID CIRCULATION CONTROL

FIELD OF THE INVENTION

The invention relates to the sphere of chemical looping combustion. In the text hereafter, what is referred to as a chemical looping combustion (CLC) process is a loop oxidation-reduction or redox process on active mass. It can be noted that, in general, the terms oxidation and reduction are used with regard to the oxidized or reduced state of the active mass respectively. The oxidation reactor is the reactor wherein the redox mass (<<active mass>> or <<oxygen carrier>>) is oxidized and the reduction reactor is the reactor wherein the redox mass is reduced. During reduction of the redox mass, the fuel can be either totally oxidized, producing $CO_2$ and $H_2O$, or partly oxidized, producing syngas CO and $H_2$.

Oxidation of the active masses can be performed in air or in the presence of a gas that can yield oxygen under the process conditions, such as water vapour for example. In this case, oxidation of the active masses allows to produce a hydrogen-rich gaseous effluent.

Preferably, the active masses are metal oxides.

More particularly, the invention relates to an improved plant and method for chemical looping combustion of a hydrocarbon feed with independent control of the circulation of the solid particles between the reaction zones, by means of one or more non-mechanical valves of L-valve type.

BACKGROUND OF THE INVENTION

Non-mechanical valves allow, through gas injection upstream from an elbow, to circulate the particles in a line. This type of equipment is well known and described in the literature (Knowlton, T. M., "Standpipes and Nonmechanical Valves", Handbook of Fluidization and Fluid-Particle Systems, Wen-Ching Yang, editor, pp. 571-597. Marcel Dekker, Inc. New York, 2003).

Figure 1:
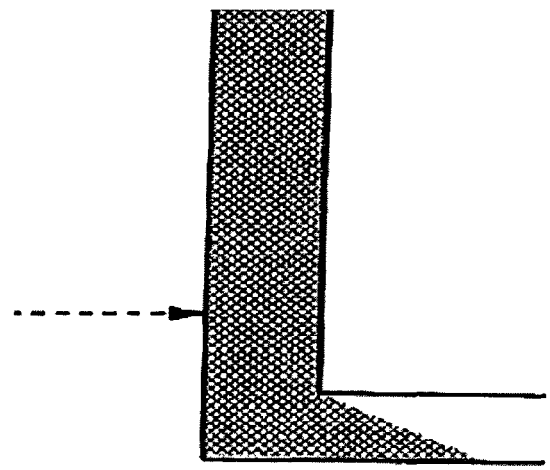
FIG. 1 is a cross-sectional view of a non-mechanical valve referred to as <<L-valve>> as described by Knowlton in Knowlton, T. M., "Standpipes and Nonmechanical Valves", Handbook of Fluidization and Fluid-Particle Systems, Wen-Ching Yang, editor, pp. 571-597. Marcel Dekker, Inc. New York, 2003.
Figures 2, 3:
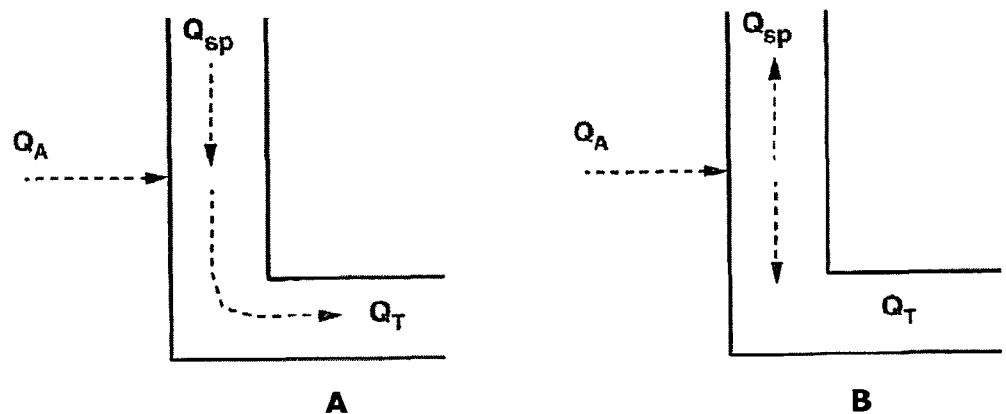
FIGS. 2 and 3 are also cross-sectional views of the same L-valve including a diagrammatic representation of the solid and gas streams, with downward gas stream (A) and upward gas stream (B), FIG. 4 diagrammatically shows a circulating bed process using L-valves (prior art), FIG. 5 diagrammatically shows a circulating bed boiler combustion process (prior art), FIG. 6 diagrammatically shows an FCC type (Fluid Catalytic Cracking) catalytic cracking process wherein slide valves or plug valves are used to control the circulation between the various enclosures (prior art), FIG. 7 diagrammatically shows a CLC (Chemical Looping Combustion) type combustion process (prior art), FIG. 8 diagrammatically shows the chemical looping combustion process with solid circulation control according to the invention, wherein the device comprises an ascending line for particle transport between the reaction zones (transport lift, variant 1), FIG. 9 diagrammatically shows the chemical looping combustion process with solid circulation control according to the invention, without an ascending line for particle transport between the reaction zones (variant 2), FIG. 10 diagrammatically shows the chemical looping combustion process according to the invention with regulation of the gas injected in the L-valves (variant 3), FIG. 11 diagrammatically shows the model described in the example.

An L-valve is thus described in FIG. 1. The L-valve consists of a vertical line equipped, at the base thereof, with a 90° elbow. If the vertical line is filled with particles, injection of a gas, upstream from this elbow close to the change in direction, allows to promote circulation of the particles in the line. Depending on the pressure conditions imposed at the system terminals, part of the gas injected flows down the line, through the elbow and promotes transport of the particles (FIGS. 2 and 3, configurations A and B). Part of the gas injected can also flow upwards countercurrent to the particle flow (FIG. 3, configuration B). The proportion of upflowing injected gas is adjusted according to the pressure conditions at the valve terminals.

L-valves allow to control the solid circulation when the flow in the vertical line upstream from the gas injection point is not fluidized (i.e. the velocity difference between the gas flow and the particles flow remains below the minimum velocity of fluidization of the particles under the conditions applied). These valves are particularly suitable for group B particles of the Geldart classification, which have a sufficiently high minimum fluidization velocity to allow a high particle flow rate.

Figure 4:
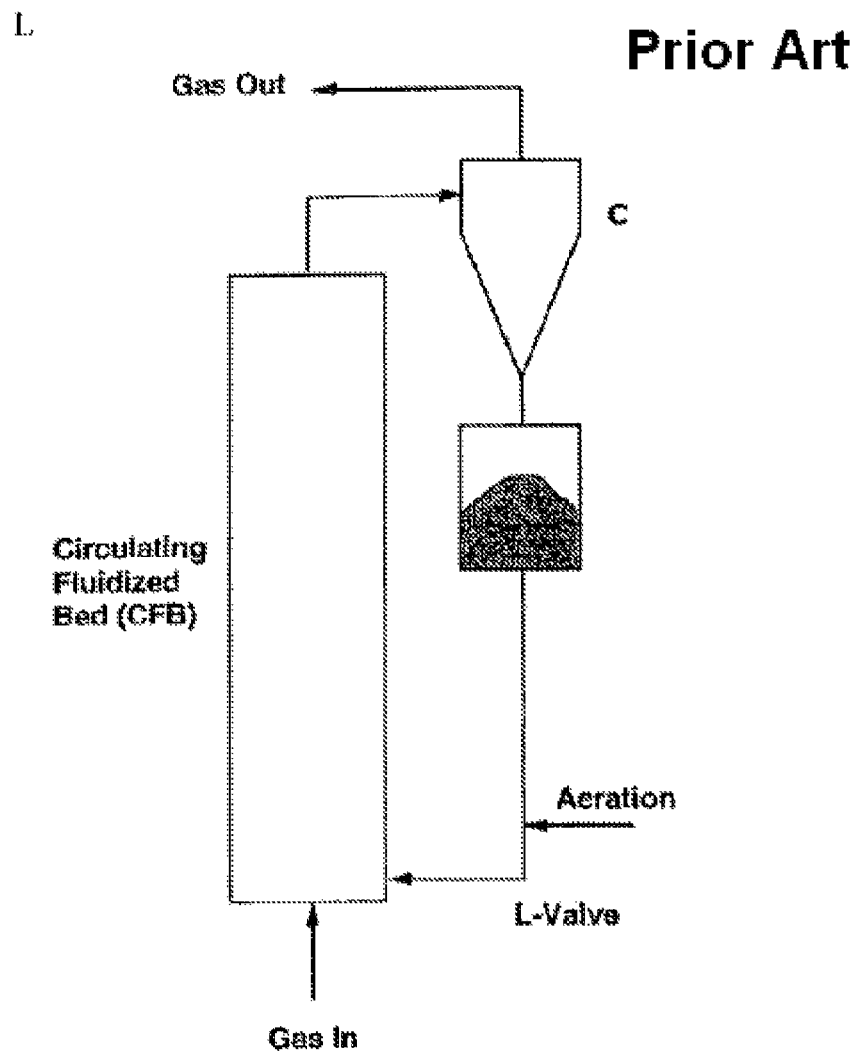

Knowlton (Knowlton, T. M., "Standpipes and Nonmechanical Valves", Handbook of Fluidization and Fluid-Particle Systems, Wen-Ching Yang, editor, pp. 571-597. Marcel Dekker, Inc. New York, 2003) describes a circulating bed system using L-valves (FIG. 4). A circulating fluidized bed (CFB) wherein gas is injected from the bottom (<<Gas In>>) allows the particles to be transported, it carries the gas and the particles to a cyclone C. The particle-free gas leaves the cyclone through a line (<<Gas Out>>) and the separated particles are fed again into the circulating bed through an L-valve. Such a system allows to uncouple the inner solid circulation within the loop from the gas flow in the circulating bed, the pressure available for transport of the particles in the circulating bed varying depending on the amount of aeration gas injected in the L-valve (which allows to vary the pressure recovery in the vertical part of the L-valve).

Figure 5:
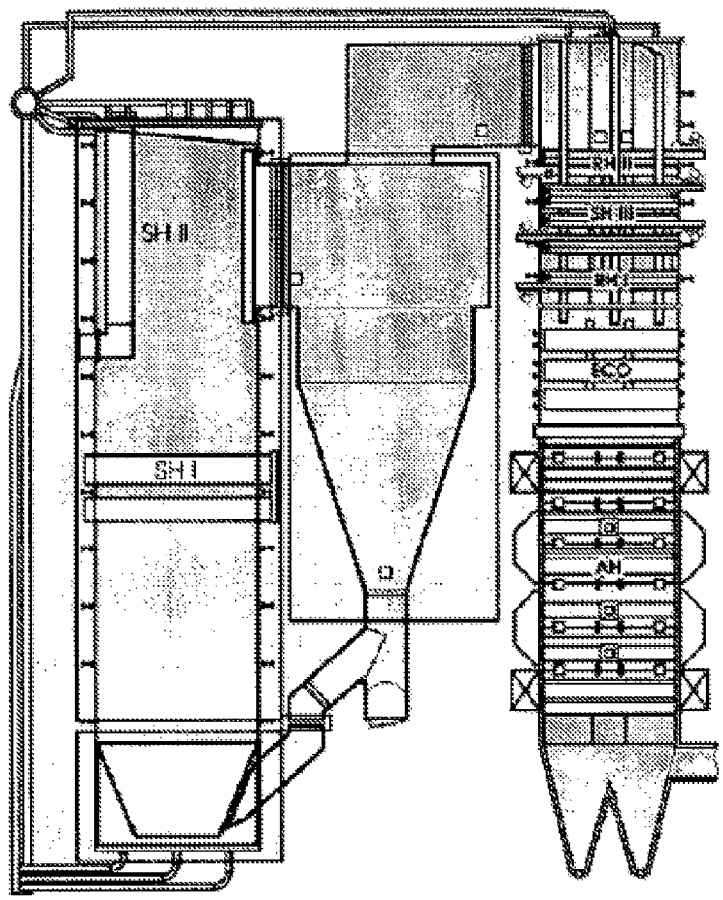

However, in conventional industrial fluidized bed combustion processes, the technologies used do not allow the inner circulation of solids in the loop to be controlled independently. A circulating bed boiler is shown in FIG. 5 (Nowak et al., IFSA 2008, Industrial Fluidization South Africa, pp. 25-33. Edited by T. Hadley and P. Smit, Johannesburg: South Africa Institute of Mining and Metallurgy, 2008). The combustion air is introduced at the base of the circulating bed and it carries the coal and sand particles to a cyclone. The particles are then recycled to the circulating fluidized bed through a return leg. The return leg is dimensioned so as to promote solid recycling but it does not allow solid circulation control. It is not equipped with L-valves. Sometimes, siphons are positioned on this return leg to prevent gas upflow in the return leg. However, in such systems, the circulation of solids within the loop entirely depends on the amount of combustion air fed into the circulating bed.

There are other means for controlling the circulation of solids. Conditions permitting, mechanical valves can be used on solids. Thus, in the fluidized bed catalytic cracking process (FCC), a method operating at temperatures below 800° C.-850° C., slide valves or plug valves are used to control the circulation between the various enclosures (FIG. 6, Gauthier, IFSA 2008, Industrial Fluidization South Africa, pp. 35-87. Edited by T. Hadley and P. Smit Johannesburg: South Africa Institute of Mining and Metallurgy, 2008).

Figure 6:
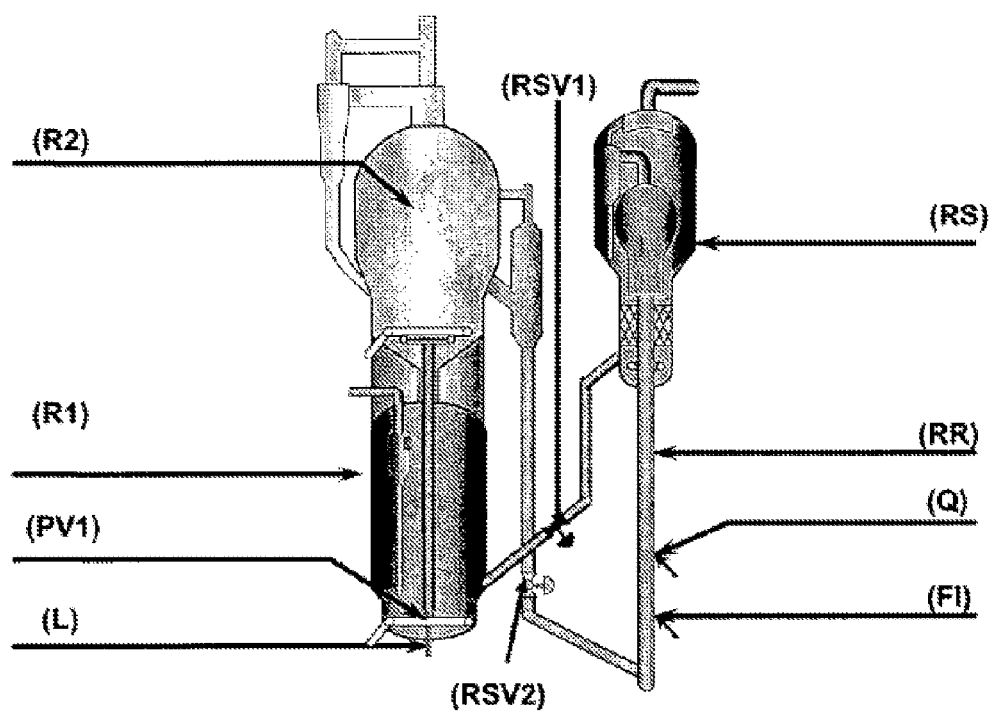

In FIG. 6, the following elements allowing the FCC process to be implemented are shown:
R1: regenerator No. 1
R2: regenerator No. 2
PV1: mechanical plug valve (plug valve No. 1)
RSV1: mechanical slide valve No. 1 (slide valve No. 1)
RSV2: mechanical slide valve No. 2 (slide valve No. 2)
L: ascending transport line (lift)
FI: feed injection
Q=quench
RR: riser reactor
RS: stripper reactor.

These valves operate on fluidized flows and they have the characteristic feature of controlling the flow by modifying the cross-section of flow, the pressure drop of these valves remaining generally constant and depending only on the conditions of fluidization of the particles upstream from the valve. These valves are particularly well-suited for operation on group A particles of the Geldart classification. Unfortunately, operation of these valves on group B particles is more delicate. In fact, it is impossible to maintain group B particles fluidized without forming large gas bubbles that disturb the flow. Furthermore, the moving parts of these valves exposed to the flow cannot be exposed to very high temperatures (>900° C.).

Chemical looping combustion is a technique allowing to carry out partial or total combustion of gaseous, liquid or solid hydrocarbon feeds, by contact with an active mass such as, for example, a metal oxide at high temperature. The metal oxide then yields part of the oxygen it contains, which takes part in the hydrocarbon combustion. It is therefore no longer necessary to bring the hydrocarbon into contact with air, as in conventional methods. Therefore, the combustion fumes predominantly contain carbon oxides, water and possibly hydrogen, not diluted by the nitrogen in the air. It is thus possible to produce fumes predominantly free of nitrogen and having high $CO_2$ contents (>90 vol. %) allowing to consider $CO_2$ capture and storage. The metal oxide that has taken part in the combustion is then transported to another reaction enclosure where it is contacted with air so as to be oxidized. If the particles from the combustion zone are free of fuel, the gases from this reaction zone are predominantly free of $CO_2$ (which is then present only as traces, for example at concentrations below 1-2 vol. %) and they essentially consist of oxygen-depleted air as a result of the oxidation of the metal particles.

The implementation of a chemical looping combustion process requires large amounts of active masses, metal oxides for example, in contact with the fuel. The metal oxides are generally contained either in ore particles, or in particles resulting from industrial treatments (iron and steel or mining industry residues, used catalysts from the chemical industry or refining). It is also possible to use synthetic materials such as, for example, alumina or silica-alumina supports on which metals that can be oxidized (nickel oxide for example) are deposited. From one metal oxide to the next, the amount of oxygen theoretically available varies considerably and it can reach high values close to 30%. However, depending on the materials, the maximum oxygen capacity really available does generally not exceed more than 20% of the oxygen present. The capacity of these materials to yield oxygen does therefore not exceed globally more than some percents by weight of the particles and it varies considerably from one oxide to the next, generally ranging from 0.1 to 10%, often from 0.3 to 1% by weight. The fluidized bed implementation is therefore particularly advantageous for conducting the combustion. In fact, the finely divided oxide particles circulate more easily in the reduction and oxidation reaction enclosures, and between these enclosures, if these particles are conferred the properties of a fluid (fluidization).

Chemical looping combustion allows to produce energy, in form of vapour or electricity for example. The combustion heat of the feed is similar to that encountered in a conventional combustion. The latter corresponds to the sum of the reduction and oxidation heats in the chemical loop. The distribution among the reduction and oxidation heats greatly depends on the active masses (notably metal oxides) used to achieve chemical looping combustion. In some cases, the exothermicity is distributed between the oxidation and the reduction of the active mass. In other cases, the oxidation is highly exothermic and the reduction is endothermic. In all cases, the sum of the oxidation and reduction heats is equal to the combustion heat of the fuel. The heat is extracted by exchangers arranged inside, on the wall of or as an appendix to the combustion and/or oxidation enclosures, on the fumes lines, or on the metal oxide transfer lines.

Figure 7:
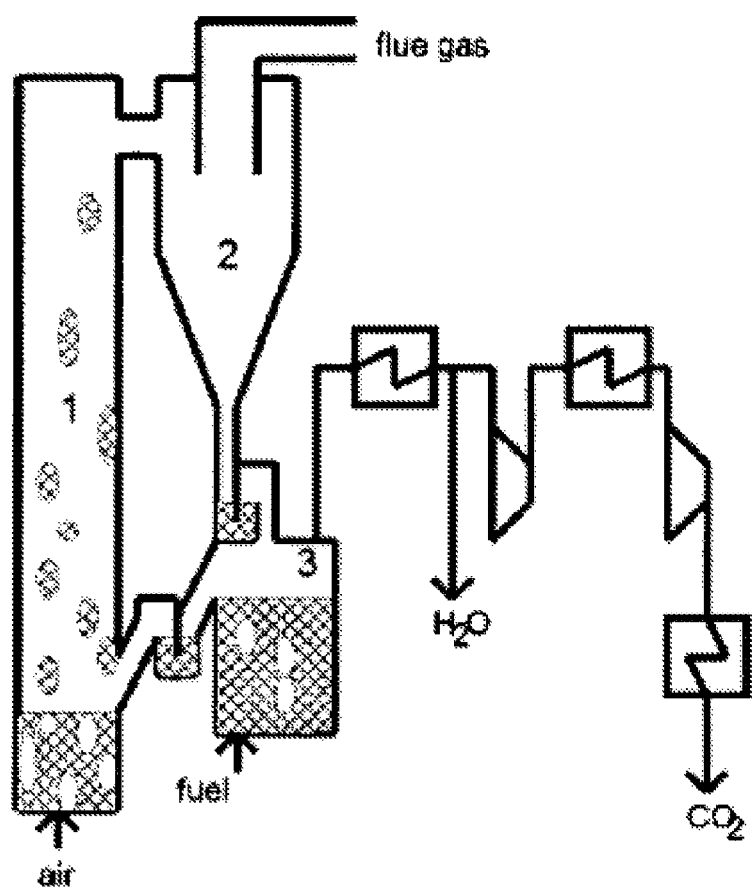

The chemical looping combustion principle is now well known (Mohammad M. Hossain, Hugo I. de Lasa, Chemical-looping combustion (CLC) for inherent CO2 separations—a review, Chemical Engineering Science 63 (2008) 4433-4451; Lyngfelt A., Johansson M., and T. Mattisson, "Chemical Looping Combustion, status of development", in CFB IX, J. Werther, W. Nowak, K.-E. Wirth and E.-U. Hartge (Eds.), Tutech Innovation, Hamburg (2008, FIG. 7)). FIG. 7 diagrammatically shows the "air" reactor (1) where the metal oxides are oxidized, a cyclone (2) allowing the particles to be separated from the gas, and the "fuel" reactor or combustion reactor (3), the seat of the metal oxides reduction. Implementation of a chemical loop in a continuous installation however remains the object of many investigations and developments.

In a conventional circulating bed combustion plant, the inner circulation of solids in the circulation loop depends on the flow of air fed into the circulating bed.

On the other hand, in a chemical looping combustion process, combustion control depends on the amount of solid particles introduced, in contact with the fuel. The circulation of the active mass particles circulating in the combustion enclosure conditions the amount of oxygen available for combustion and the final oxidation state of the active mass at the end of the combustion process. Once combustion complete, the active mass (metal oxide in most cases) has to be oxidized again in contact with air in a distinct enclosure. The circulation between the two enclosures conditions:
the oxygen exchange between the reduction reactor and the oxidation reactor,
the heat exchange between the combustion reactor and the oxidation reactor,
the gas transfer between the two enclosures that has to be minimized.

It is thus important to be able to control the circulation of solids in the air reactor and in the combustion reactor, independently of the circulating gas flow rates conditioning the transport of particles within each one of these enclosures (air in the oxidation reactor, vapour, hydrocarbons or combustion fumes in the fuel reactor).

The various methods provided so far do not allow independent control of the oxide circulation. Thus, Johannsonn et al. (2006) provide a chemical looping combustion process wherein oxidation of the metal oxides occurs in a circulating bed. The oxides are separated in a cyclone that feeds through discharge the fuel reactor where combustion takes place. The metal oxide is then recycled to the oxidation reactor. Such a system does not allow to control the circulation of metal oxides independently of the air flow rate in the oxidation reactor. The flow rate of metal oxide circulating in the combustion reactor can only be modified by changing the air flow rate in the air reactor.

Another device is described in patent FR-2,850,156. In this case, the two reactors, combustion and oxidation, are circulating beds. Here again, the circulation between the two reactors depends on the flow of gas fed into each enclosure. In both cases, siphons are positioned on the transfer lines allowing transport of the metal oxides. These siphons allow to provide sealing of the gas phases between the two enclosures by preventing gas coming from the oxidation reactor from circulating towards the combustion reactor through the transfer lines, and vice versa. These siphons do not allow to control and to modify the circulation of metal oxides.

Furthermore, the chemical looping combustion method is preferably implemented at high temperature (between 800° C. and 1200° C., typically between 900° C. and 1000° C.). It is therefore not possible to control the circulation of metal oxides using mechanical valves conventionally used in other processes such as FCC.

The object of the invention thus is to provide a novel plant and a novel method allowing to control the circulation of solids in the chemical loop independently of the gas flows circulating in the combustion (reduction) and oxidation enclosures.

OBJECT OF THE INVENTION

One object of the present invention is a chemical looping combustion method allowing to achieve total or partial combustion of gaseous, liquid or solid hydrocarbons.

Another object of the invention is a chemical looping combustion plant allowing to achieve total or partial combustion of gaseous, liquid or solid hydrocarbons.

The method according to the invention is implemented in a plant comprising at least two fluidized reaction zones, one contacting solid particles of active mass (of metal oxide type for example) with air so as to oxidize the particles, the other contacting the hydrocarbons with the active mass so as to carry out the combustion reactions, the combustion oxygen being provided by the reduction of the active mass particles.

In the method and in the plant according to the invention, the circulation of the solids (active mass particles acting as oxygen carriers) between the various reaction zones is controlled by non-mechanical valves of L-valve type, consisting each of a substantially vertical line, then of a substantially horizontal line, a control gas being injected upstream from the elbow.

The present invention also relates to the use of said chemical looping combustion method with control of the circulation of the solids for heat production, for syngas production or for hydrogen production.

DESCRIPTION OF THE INVENTION

Summary of the Invention

The invention relates to a chemical looping combustion method for at least one hydrocarbon feed in at least one distinct fluidized bed reduction reaction zone (i) and at least one distinct fluidized bed oxidation reaction zone (i+1), wherein the circulation of the solid particles of active mass between each or part of the reaction zones is controlled by means of one or more non-mechanical valves consisting each of a substantially vertical line portion, a substantially horizontal line portion and an elbow connecting the two portions, by carrying the solid particles between two successive reaction zones by:

introducing solid particles coming from reaction zone (i) or (i+1) through the upper end of the substantially vertical line portion of said valve, injecting a control gas with a given aeration flow rate upstream from the elbow of said valve, controlling the differential pressure conditions at the terminals of the non-mechanical valve(s) so as to adjust the flow rate of the solid particles in the substantially horizontal line portion of said valve, according to the aeration flow rate, feeding into the successive reaction zones (i+1) or (i) of the loop the solid particles leaving the non-mechanical valve(s).

Each reaction zone can consist of a set of one or more fluidized reactors arranged in relation to one another.

Several non-mechanical valves can be positioned in parallel between two successive reaction zones.

An embodiment of the method according to the invention comprises:

additionally feeding between (at least) two successive reaction zones (i) and (i+1), downstream from the non-mechanical valve(s), a carrier gas in an ascending transport line (lift), said line being fed with the solid particles leaving the non-mechanical valve(s), carrying out transport of the solid particles from zone (i) to zone (i+1) through passage of the fluidized particles into the non-mechanical valve(s) located between zones (i) and (i+1), then through transport of the solid particles by means of at least one carrier gas injected into the ascending transport line, and separating the solid particles from the carrier gas by means of gas-solid separation means arranged at the outlet of the ascending line so as to supply zone (i+1) with solid particles, carrying out transport of the solid particles from the outlet of zone (i+1) to zone (i) through passage of the fluidized particles into the non-mechanical valve(s) located between zones (i+1) and (i), then through transport of the solid particles by means of at least one carrier gas injected into the ascending transport line, and separating the particles from the carrier gas by means of gas-solid separation means arranged at the outlet of the ascending line so as to supply zone (i) with solid particles.

In another embodiment of the method according to the invention, a reaction zone (i+1) is located at least partly above the previous reaction zone (i) and:

the solid particles are transported from zone (i+1) to zone (i) by gravity flow by means of the non-mechanical valve(s) located between zones (i+1) and (i), transport of the solid particles from zone (i) to zone (i+1) is performed by passage of the fluidized particles into the non-mechanical valve(s) located between zones (i) and (i+1), then by transport of the solid particles by means of at least one carrier gas injected into an ascending transport line, and the solid particles are separated from the carrier gas by means of gas-solid separation means arranged at the outlet of the ascending line so as to supply zone (i+1) with solid particles.

Another object of the invention is a chemical looping combustion plant for at least one hydrocarbon feed in the presence of solid particles of active mass, comprising at least one fluidized bed reduction reaction zone (i), at least one fluidized bed oxidation reaction zone (i+1), at least one ascending means for circulation (6) of said particles from said reduction reaction zone (i) and said oxidation reaction zone (i+1), said particles being carried into the ascending circulation means by a carrier gas (19), at least one gas-solid separation means (7) arranged at the outlet of said ascending circulation means and connected to said oxidation reaction zone (i+1) by a line (8), at least a first valve for controlling the circulation of said particles between oxidation reaction zone (i+1) and reduction reaction zone (i) and at least a second valve for controlling the circulation of said particles between reduction reaction zone (i) and ascending circulation means (6), said valves comprising at least one means (11, 4) for injecting a control gas with a given aeration flow rate.

In a variant of the invention, the plant can furthermore comprise:
  at least a second ascending circulation means (12) for said particles of said oxidation reaction zone (i+1) and of said reduction reaction zone (i), said particles being carried into the ascending circulation means by a second carrier gas (20), said second ascending circulation means being arranged between said first control valve and said reduction reaction zone (i), and
  at least a second gas-solid separation means (13) arranged at the outlet of said second ascending circulation means (12) and connected to said reduction reaction zone (i).

It is possible to control the circulation of the solids through servo-control of the aeration flow rate of the control gas of the non-mechanical valves by level measurements in the fluidized reactors and/or pressure drop measurements in the transport lines, performed in the reaction zones.

Thus, the aeration flow rate of the control gas (4) can be controlled by a regulation valve (21) servo-controlled (23) by the level measurement means (25) in at least one fluidized bed of reduction reaction zone (i) and the aeration flow rate of the control gas (11) can be controlled by a regulation valve (22) servo-controlled (24) by the pressure drop measurement means (26) in the ascending transport line carrying the particles to the $1^{st}$ reaction zone (12).

Advantageously, a length of the horizontal portion of the non-mechanical valve(s) Lh is selected between 1 and 20 times the diameter of the horizontal line portion Dh, preferably between 3 and 7 times Dh.

Advantageously, the diameter of the vertical line portion Dv is selected greater than or equal to the diameter of the horizontal line portion Dh of the non-mechanical valve(s).

Preferably, the diameter of the vertical line portion Dv and the diameter of the horizontal line portion Dh of the non-mechanical valve(s) are selected substantially identical.

Advantageously, the control gas injection point upstream from the elbow is positioned at a distance x (difference between the height of the injection point in the vertical part and the lowest point of the non-mechanical valve) of the order of 1 to 5 times the diameter of the vertical line portion Dv.

Preferably, the solid active mass particles belong to group B of the Geldart classification.

More preferably, the solid active mass particles are metal oxides.

The invention also relates to the use of the method according to the invention for hydrogen production, syngas production or heat production.

DETAILED DESCRIPTION

Chemical looping combustion allows to produce heat, syngas, hydrogen by circulation of solid particles containing active masses acting as oxygen carriers, such as metal oxides, between several reaction zones where the metal oxide is successively exposed to contact with an oxidizing medium (air for example), then with a reducing medium (a gaseous, liquid or solid hydrocarbon for example).

In order to facilitate circulation and contact, the invention relates to a method wherein the reaction zones consist of fluidized bed reactors.

Within the context of heat production, the active mass particles (metal oxide particles for example) are advantageously contacted with air in a fluidized bed, where the metal oxides are oxidized, then they are carried through lines to a fluidized bed where the metal oxides are contacted with hydrocarbons, for example methane, natural gas, a heavy fuel oil containing petroleum distillation residues, oil coke or coal. The oxide is then reduced in contact with the hydrocarbons and it burns on contact with the oxygen provided by the particles. The fumes of the combustion zone essentially contain the products resulting from the partial or total combustion ($CO$, $H_2$, $CO_2$, $H_2O$, $SO_x$, ... ) in the absence of nitrogen, and the bed can be fluidized by combustion fumes, water vapour for example. Therefore, the fumes are then readily treated in order to concentrate if need be the $CO_2$ or the syngas produced (water condensation, fumes desulfurization), which makes capture of the $CO_2$ or use of the syngas easy and interesting. The combustion heat can be recovered by heat exchange within the reaction zones to produce vapour or any other use.

Within the context of hydrogen production, it is also possible to integrate other reaction zones in the process, where the particles containing the reduced metal oxides are exposed for example to a hydrocarbon or water vapour.

The conditions under which the reduction and oxidation reactions are carried out by contact with metal oxides are severe. The reactions are generally conducted between 800° C. and 1200° C., typically between 900° C. and 1000° C. The methods intended for energy production advantageously operate at a pressure that is as close as possible to the atmospheric pressure. The methods intended for syngas or hydrogen production preferably operate at higher pressures, which allow downstream implementation of methods using the reaction products so as to minimize the energy consumption linked with the compression of the gas produced, typically ranging between 20 and 50 bars, 30 bars for example in the case of the use of the syngas as the feed in a Fischer-Tropsch process.

The reaction times required to carry out the oxidation and reduction reactions depend on the nature of the feeds treated and on the metal oxides used, and they range from some seconds to about ten minutes. The combustion reactions of the liquid and solid feeds generally require longer reaction times, of the order of several minutes for example.

Nature of the Solid Active Mass Particles

The plant and the method according to the invention can be used with any type of active mass. Preferably, the active mass particles are metal oxide particles.

Implementation of a chemical looping combustion method requires large amounts of active mass in contact with the fuel.

Preferably, these solids are conditioned in form of powder of Sauter diameter ranging between 30 and 500 microns and of grain density ranging between 1400 and 8000 kg/m$^3$, preferably between 1400 and 5000 kg/m$^3$.

The flow properties of the particles vary according to the grain size thereof (Geldart, 1973). Thus, the particles of group A of the Geldart classification, which are finer, are characterized by lower fluidization velocities and low-velocity fluidization characteristics allowing to consider a fluidized dense transport. The particles of group B of the Geldart classification, which are thicker, are characterized by higher fluidization velocities and fluidization characteristics allowing to consider a non-fluidized dense transport in lines between two reaction enclosures.

In cases where the active mass consists of metal oxides, the latter are generally either contained in ore particles (Fe, Ti, Ni, Cu, Mg, Mn, Co, V oxides, used alone or in admixture), or in particles resulting from industrial treatments (iron and steel or mining industry residues, used catalysts from the chemical industry or refining). It is also possible to use synthetic materials such as, for example, alumina or silica-alumina supports on which metals that can be oxidized (nickel oxide for example) are deposited.

From one metal oxide to the next, the amount of oxygen theoretically available varies considerably and it can reach high values close to 30%. However, depending on the materials, the maximum oxygen capacity really available does generally not exceed more than 20% of the oxygen present. The capacity of these materials to yield oxygen does therefore not exceed globally more than some percents by weight of the particles and it varies considerably from one oxide to the next, generally ranging from 0.1 to 15%, often from 0.3 to 1% by weight. The fluidized bed implementation is therefore particularly advantageous to conduct the combustion. In fact, the finely divided oxide particles circulate more easily in the reduction and oxidation reaction enclosures, and between these enclosures, if the particles are conferred the properties of a fluid (fluidization).

Circulation of the Solids Between the Reaction Zones

It is essential to control the circulation of the solid particles acting as the active mass (or oxygen carriers), such as metal oxide particles for example, in order to ensure smooth operation of the chemical looping process. In fact, transport of the particles between the enclosures conditions the transport of oxygen, a reactant that is essential for smooth operation of the process and heat exchanges between the various zones, and therefore the temperature level at which each zone operates depending on the temperature in the other zones. Transport of the particles also has to be studied as a gas exchange vector between the various zones, and the particles flowing in the transfer zones can carry along gases from one reaction zone to the next.

At the temperature levels considered, mechanical valves cannot be used to control the circulation of solids between two reaction zones, except if the stream is cooled before contact with the valve, an energetically penalizing and technologically complex option. The object of the invention therefore consists in implementing a method using L type non-mechanical valves consisting of a substantially vertical line, a substantially horizontal line, a control gas being injected upstream from the elbow made up of the two lines.

The particles from the first reaction zone flow into the L-valve through the upper end of the substantially vertical line, feeding the valve through withdrawal means (cone, inclined line, withdrawal well, . . . ) known to the person skilled in the art.

They then flow through the vertical part in a granular flow, the real velocity difference between the particles and the gas being below the minimum fluidization velocity.

The control gas injected into the L-valve can either flow upwards countercurrent to the particles flowing down the vertical line, or downwards with the particles and promote the flow of the particles in the horizontal part of the valve.

The distribution between the ascending gas and the descending gas depends on the differential pressure conditions at the terminals of the L-valve. If the pressure upstream from the valve increases in relation to the pressure downstream from the valve for example, it can normally be observed that the proportion of ascending gas decreases. The flow rate of solid in the horizontal part depends on the amount of descending gas circulating with the particles in the horizontal part.

L-Valve Dimensioning

Dv is the diameter of the line of the vertical part of the L-valve and Dh is the diameter of the line in the horizontal part, Lh the length of the horizontal line and Lv the length of the vertical line, and x the distance between the height of the control gas injection point in the vertical part and the lowest part of the L-valve.

Height Lv depends on the relative position of the two reaction enclosures and on the pressure gains or drops to be compensated for so as to complete the pressure balance of the process. This height thus results from the dimensioning of the plant individually by the person skilled in the art.

Advantageously, the horizontal line length has to be limited to provide stable particle flow. This length Lh preferably ranges between 1 and 20 Dh, preferably between 3 and 7 Dh. Operation of the L-valve is favoured if diameters Dv and Dh are substantially identical. In any case, the diameter of the horizontal part Dh is preferably greater than or equal to Dv.

Finally, the control gas injection point upstream from the elbow is positioned close thereto, preferably at a distance X of the order of 1 to 5 Dv, the typical values being close to X=2-3 Dv.

Between two reaction zones, it is possible to position one or more L-valves in parallel.

Operation of the Plant and of the Method According to the Invention

Figure 8:
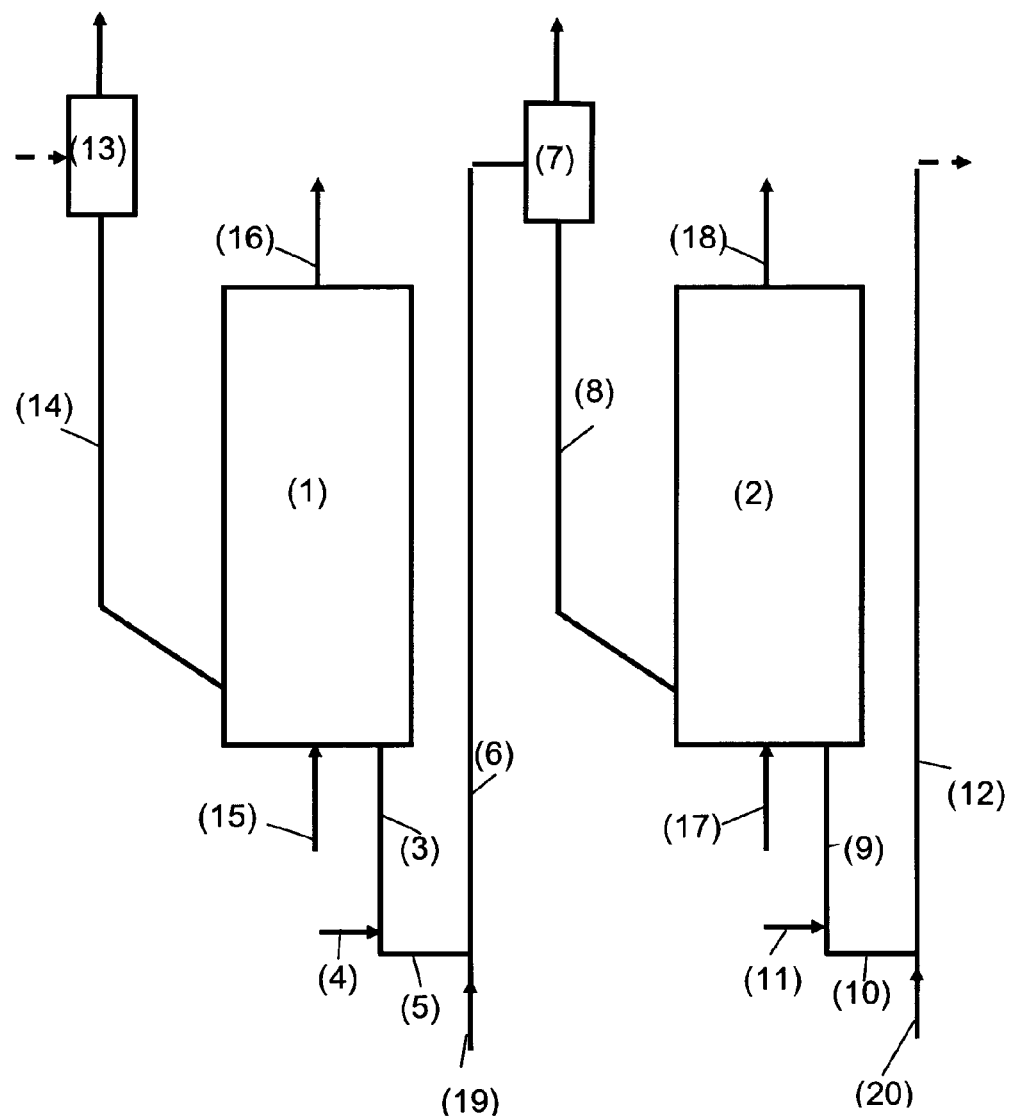

FIG. 8 describes a first embodiment of the invention. The method implemented is a combustion method using the chemical loop principle.

A first reduction reaction zone (1) allows contact between a gaseous, liquid or solid hydrocarbon (15) and the active mass particles (metal oxide here) to achieve combustion. The reaction zone can be a simple fluidized bed reactor consisting of a gas distribution box on the section of the fluidized bed, and means for dedusting the gaseous effluents (16) consisting, in the present case, of $CO_2$-concentrated fumes, or a combination of fluidized beds, or circulating fluidized beds with internal or external particle recycling.

In this reaction zone, at least part of the contact zone between the hydrocarbons and the metal oxide consists of a dense fluidized phase. The metal oxide particles are withdrawn from first reaction zone (1), the withdrawn particles are fed into a vertical line (3) ending in a horizontal line (5) forming an L-valve. A control gas (nitrogen, water vapour or fumes for example) is injected into this L-valve through a line (4). The solid circulation in L-valve (3-5) depends on the amount of gas injected through line (4). The particles leave the L-valve and are fed into an ascending transport line (lift) (6) supplied with a carrier gas (19). At the outlet of lift (6), separation means (7) such as cyclones allow to separate the carrier gas from the particles. Said particles are then carried through a line (8) to second reaction zone (2) where the reactions of oxidation of the oxide particles through contact with the air fed into the second reaction zone through a line (17) take place. The reaction zone can be a simple fluidized bed reactor consisting of a gas distribution box on the section of the fluidized bed, and means for dedusting the gaseous effluents (18) consisting, in the present case, of depleted air, or a combination of fluidized beds, or circulating fluidized beds with internal or external particle recycling. In this reaction zone, at least part of the contact zone between the hydrocarbons and the metal oxide consists of a dense fluidized phase. The metal oxide particles are withdrawn from second reaction zone (2), the withdrawn particles are fed into a vertical line (9) ending in a horizontal line (10) forming an L-valve. A control gas (nitrogen, water vapour or air for example) is injected into this L-valve (11). The solid circulation in L-valve (9-10) depends on the amount of gas injected through line (11). The particles leave the L-valve (9-10) and are fed into an ascending transport line (lift) (12) supplied with a carrier gas (20). At the outlet of the lift, separation means (13) such as cyclones allow to separate the carrier gas from the particles that are carried through a line (14) to first reaction zone (1) where the combustion reaction take place.

FIG. 8 describes a method and a plant with two reaction zones, but it is possible to consider a sequence of three or more reactions zones arranged sequentially as in FIG. 8.

In the implementation of the method according to the invention, transfer of the particles between the reaction zones only depends on the amount of control gas injected into the L-valves. It is thus possible to vary the circulation of metal oxides by modifying the flow of control gas injected into the L-valves, all the other fluids (15, 17, 19, 20) being maintained constant.

In the L-valves, the flow of the particles in the vertical part (3, 9) is a dense non-fluidized granular flow, the particles flowing with a relative velocity in relation to the gas circulating in these lower lines at the minimum fluidization velocity. Implementation of the method is preferably performed with particles belonging to group B of the Geldart classification. The gas injected into the L-valves (4, 11) generally represents a small proportion (<1%) of the gas required for transport (19, 20), the minimum fluidization velocity of these materials being very low in relation to the particle transport velocity.

The carrier gas used in the ascending transport lines (lifts) (6, 12) can thus consist of vapour, recycled fumes, air or inert gas, and according to the selection thereof, it can allow to create a buffer zone preventing mixing of the gases carried from one reaction zone to the next.

In the configuration described in FIG. 8, the L-valve feeds an ascending transport line (lift) allowing transport of the particles. The lift is equipped, at the outlet thereof, with separation means allowing disengagement of the carrier gas. It is thus possible to introduce between the two reaction enclosures (1) and (2) a gas for transport of the particles, and this gas enters neither enclosure (1) nor enclosure (2) due to the separation means arranged at the outlet of the transport lift. This configuration is particularly advantageous when gas sealing is desired between the reaction enclosures. In fact, the gas used for control of the circulation in the L-valve and the carrier gas in the lift can consist of inert gases (water vapour, nitrogen, carbon dioxide, . . . ) that provide sealing between reaction zone (1) where hydrocarbons in gas phase can be found and reaction zone (2) where oxygen in gas phase can be found. The amounts of gas carried from reaction zones (1) or (2) to the L-valves are zero or very low. They depend on the respective pressure rises of the enclosures and on the flow rates of the circulating particles. These small amounts are diluted by the lift carrier gas (an inert gas for example) and discharged from the unit through the gas outlets of separators (7, 13) arranged at the outlet of the transport lifts. It can thus be seen that the configuration involving the layout of L-valves and lifts between the reaction zones allows to control the circulation and to provide gas sealing between the reaction zones.

Figure 9:
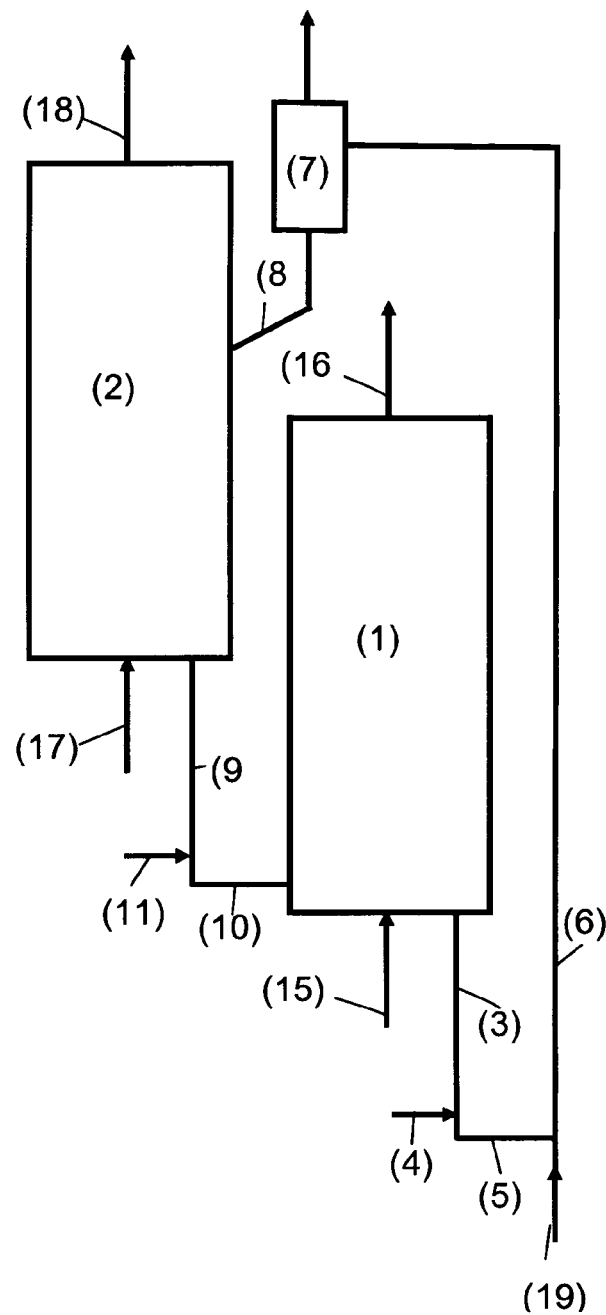

FIG. 9 shows another possible layout that simply differs from the configuration shown in FIG. 8 in that oxidation reaction zone (2) is located at least partly above reduction-combustion zone (1). It is then possible to transport the oxide particles from zone (2) to zone (1) without using a transport lift. A simple L-valve (9, 10, 11) then allows the particles to be transferred from zone (2) to zone (1). Transfer from zone (1) to zone (2) is achieved using an L-valve (3, 4, 5), an ascending transport line (6) and separations means (7) intended for the metal oxides and the carrier gas.

Figure 10:
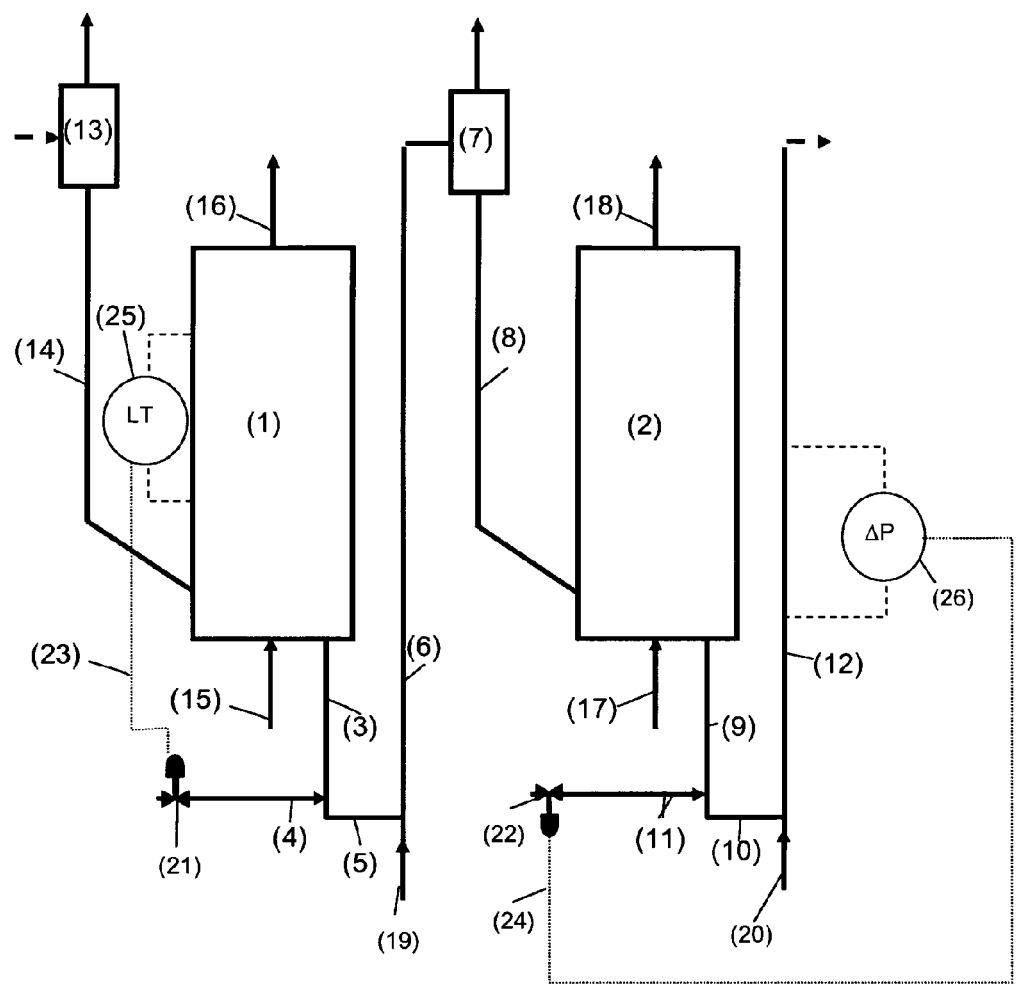

It is possible to control the circulation of solids in the process between the various enclosures through regulation of the gas injected into the L-valves. FIG. 10 takes up the method described in FIG. 8. If a valve regulates the injection of gas into the L-valve, it is possible to servo-control the amount of gas injected into the L-valve by level measurements in a dense phase fluidized bed or indirect measurement of the circulation flow, such as the pressure drop in a transport lift. Thus, in FIG. 10, gas injection (4) is controlled by a regulation valve (21) servo-controlled (23) by level measurement means (25) in a fluidized bed of reaction enclosure (1) and gas injection (11) is controlled by a regulation valve (22) servo-controlled (24) by the measurement of the pressure drop (26) in lift (12). Other servo-control strategies are possible.

EXAMPLE

The example of a circulation loop dimensioned according to the main characteristics of the invention and used under ambient reactionless conditions is given hereafter in order to illustrate the operation of the invention.

Figure 11:
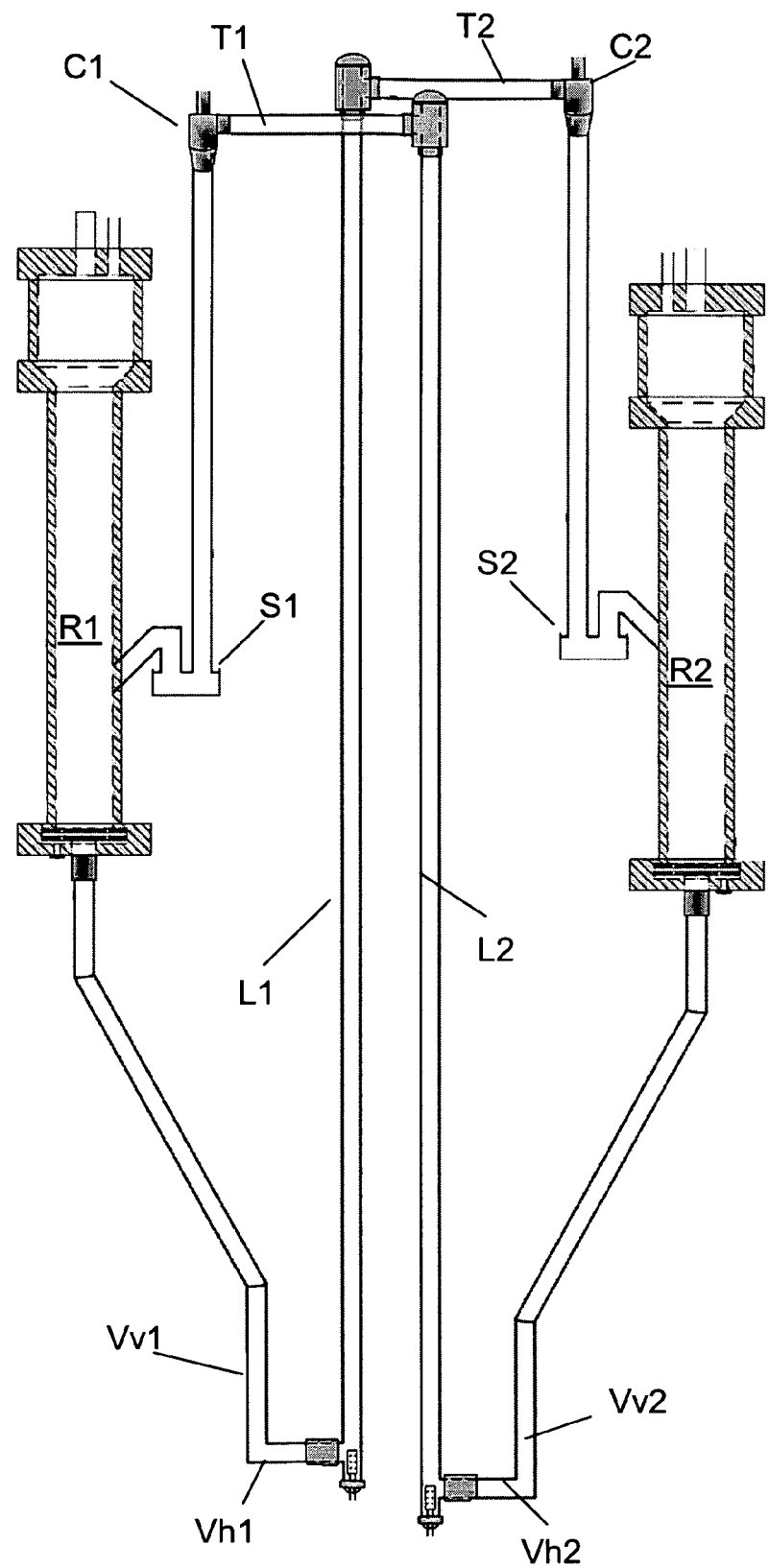

The model (FIG. 11) mainly consists of two identical fluidized beds R1 and R2, 10 cm in diameter, connected to one another by two loops referred to as circulating loops. Each loop is made up of a 20-mm diameter and 2.5-m long lift (ascending transport line) supplied by an L-valve, also referred to as L-shaped leg, consisting of a vertical section and of a horizontal section of equal diameter (16 mm) wherein an aeration gas is injected at an elevation of 30 mm in relation to the bottom of the L-valve. The particles are withdrawn from the fluidized bed (R1 or R2) at the top of the vertical part (Vv1 or Vv2) of the L-valve. They flow through the vertical part, then the horizontal part (Vh1 or Vh2) of the L-valve. They are then carried to a lift (L1 or L2) at the end of which a cyclone (C1 or C2) separates the carrier gas of the lift from the particles. The particles are reinjected into the fluidized bed (R2 or R1) through a return leg and a siphon (S1 or S2).

The particles used during this test are sand particles of mean diameter 205 microns and grain density equal to 2500 kg/m$^3$. In fluidized beds R1 and R2, the particles are fluidized at a superficial velocity of 0.08 m/s. This gas velocity is higher than the minimum fluidization velocity (Umf) of the order of 0.03 m/s. The solid particles flow downwards from first reactor R1 into vertical leg $V_{v1}$, then their circulation in horizontal leg $V_{h1}$ is provided by the injection of a control gas (aeration flow) introduced upstream from the change in direction of the flow in the L-valve. The solid flow rate is controlled by adjusting the aeration flow rate. In the lift, a constant carrier gas flow rate is maintained. This carrier gas is introduced at the bottom of the lift and it is different from the aeration gas introduced into the L-valve.

In order to provide satisfactory particle transport, gas velocity UL1 or UL2 in lifts L1 or L2 is maintained constant and equal to 6 m/s. Downstream from the lift, the suspension circulates in a horizontal transport line T1 or T2 supplying a cyclone C1 or C2 that allows separation between the particles and the gas. The gas leaves the cyclone through the upper outlet thereof and the solid is sent to a siphon S1 or S2 prior to being sent back to the second reactor (R2 or R1).

The amount of control gas (aeration gas) injected into the L-valve is a function of the cross-section of flow in the vertical part of the L-valve (diameter=16 mm). It is thus possible to calculate the empty bed superficial velocity of the aeration in this section. The aeration in L-valve 1 is then expressed by its empty bed superficial velocity $U_{v1}$ and the aeration in L-valve 2 is expressed by its empty bed superficial velocity $U_{v2}$.

The amounts of gas sent to the L-valves, which correspond to velocities $U_{v1}$ and $U_{v2}$, respectively allow to control the flow of solid sent to reactor R2 via lift L1 (FIG. 12) and to reactor R1 via lift L2.

Figure 12:
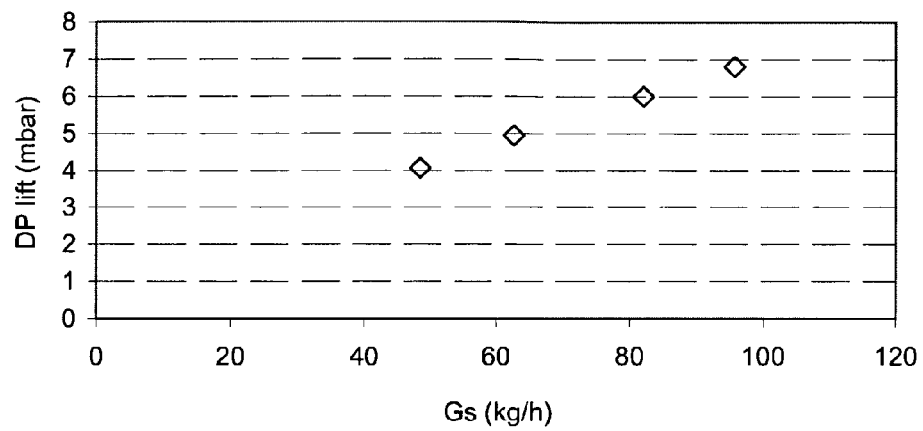
FIG. 12 is a graph representing the pressure drop in an ascending lift type transport line as a function of the circulating solid flow rate.

In the loop, it is possible to estimate the flows of solid by means of non-stationary operations during which the level variations as a function of time in the enclosures allow to measure the instantaneous solid flow rates. These solid flow rates are then correlated with the pressure drops in the transport lifts. In fact, it is well known that, for a fixed gas volume flow rate, the pressure drop in a lift increases when the solid flow rate increases. In this example, the increase of this pressure drop is substantially linear as a function of the solid flow rate, as shown in FIG. 12, the two lifts having similar pressure drops (their geometry and the imposed transport velocity are identical).

Once these preliminary calibrations achieved, continuous operation in the plant is established by imposing an identical control gas aeration flow rate in each one of the two L-valves. When the flow rate of the control gas injected corresponds to a gas velocity in each L-valve (Uv1 and Uv2) equal to 0.15 m/s, stable operation is observed, the levels in each enclosure remaining constant over time. The pressure drop measured under such conditions in each lift is about 5 mbar, which corresponds to a solid flow rate in each lift of about 60 kg/hour (FIG. 12).

The aeration flow rate in each L-valve is then increased so as to reach a superficial velocity (Uv1 and Uv2) of 0.175 m/s. The solid circulation then reaches approximately 80 kg/h (pressure drop recorded in the lifts equal to 6 mb). By reducing then the aeration flow rate in the L-valves to 0.13 m/s, the solid circulation is decreased to about 48 kg/h (pressure drop recorded in the lifts equal to 4 mb).

Figure 13:
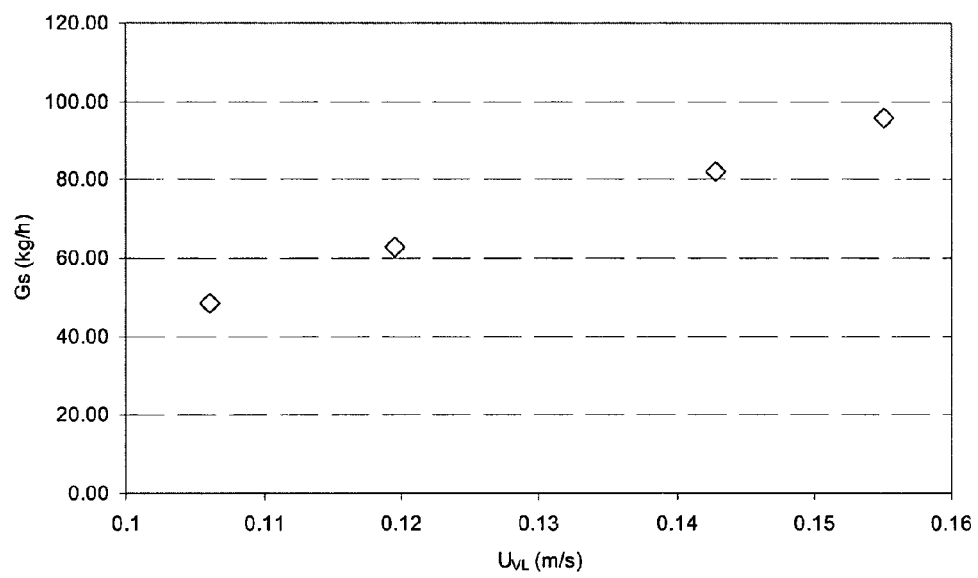
FIG. 13 is a graph representing the relation between the aeration flow rate in each L-valve and the flow rate of solid circulating in the plant.

This example shows that the solid circulation in the plant only depends on the aeration imposed by the control gas in the L-valves. FIG. 13 shows the relation between the aeration flow rate in each L-valve and the flow rate of the solid circulating in the plant.

The invention claimed is:

1. A chemical looping combustion method for at least one hydrocarbon feed in at least one distinct fluidized bed reduction reaction zone (i) and at least one distinct fluidized bed oxidation reaction zone (i+1), wherein the circulation of the solid particles of active mass between each or part of the reaction zones is controlled by means of one or more non-mechanical valves consisting each of a substantially vertical line portion, a substantially horizontal line portion and an elbow connecting the two portions, by transporting the solid particles between two successive reaction zones by:
  introducing solid particles coming from reaction zone (i) or (i+1) through the upper end of the substantially vertical line portion of said valve,
  injecting a control gas with a given aeration flow rate upstream from the elbow of said valve,
  controlling the differential pressure conditions at the terminals of the non-mechanical valve(s) so as to adjust the flow rate of the solid particles in the substantially horizontal line portion of said valve, according to the aeration flow rate,
  feeding into the successive reaction zones (i+1) or (i) of the loop the solid particles leaving the non-mechanical valve(s).

2. A chemical looping combustion method as claimed in claim 1, wherein each reaction zone consists of a set of one or more fluidized reactors arranged in relation to one another.

3. A chemical looping combustion method as claimed in claim 1, wherein at least two non-mechanical valves are arranged in parallel between two successive reaction zones (i) and (i+1).

4. A chemical looping combustion method as claimed in claim 1, comprising:
  additionally feeding between at least two successive reaction zones (i) and (i+1), and downstream from the non-mechanical valve(s), a carrier gas in an ascending transport line, said line being fed with the solid particles leaving the non-mechanical valve(s),
  carrying out transport of the solid particles from zone (i) to zone (i+1) through passage of the fluidized particles into the non-mechanical valve(s) located between zones (i) and (i+1), then through transport of the solid particles by means of at least one carrier gas injected into the ascending transport line, and separating the solid particles from the carrier gas by means of gas-solid separation means arranged at the outlet of the ascending line so as to supply zone (i+1) with solid particles,
  carrying out transport of the solid particles from the outlet of zone (i+1) to zone (i) through passage of the fluidized particles into the non-mechanical valve(s) located between zones (i+1) and (i), then through transport of the solid particles by means of at least one carrier gas injected into the ascending transport line, and separating the particles from the carrier gas by means of gas-solid separation means arranged at the outlet of the ascending line so as to supply zone (i) with solid particles.

5. A chemical looping combustion method as claimed in claim 1, wherein a reaction zone (i+1) is located at least partly above the previous reaction zone (i) and:
  the solid particles are transported from zone (i+1) to zone (i) by gravity flow by means of the non-mechanical valve(s) located between zones (i+1) and (i)
  transport of the solid particles from zone (i) to zone 9i+1)is performed by passage of the fluidized particles into the non-mechanical valve(s) located between zones (i) and (i+1), then by transport of the solid particles by means of at least one carrier gas injected into an ascending transport line, and the solid particles are separated from the carrier gas by means of gas-solid separation means arranged at the outlet of the ascending line so as to supply zone (i+1) with solid particles.

6. A chemical looping combustion method as claimed in claim 1, wherein circulation of the solids is controlled through servo-control of the aeration flow rate of the control gas of the non-mechanical valves by level measurements in the fluidized reactors and/or pressure drop measurements in the transport lines, performed in the reaction zones.

7. A chemical looping combustion method as claimed in claim 6, wherein the aeration flow rate of the control gas is controlled by a regulation valve servo-controlled by the level measurement in at least one fluidized bed of reduction reaction zone (i) and the aeration flow rate of the control gas is controlled by a regulation valve servo-controlled by the pressure drop measurement in the ascending transport line carrying the particles to the other reaction zone.

8. A method as claimed in claim 1, wherein a length of the horizontal portion of the non-mechanical valve(s) Lh is selected between 1 and 20 times the diameter of the horizontal line portion Dh.

9. A method as claimed in claim 1, wherein the diameter of the vertical line portion Dv is selected greater than or equal to the diameter of the horizontal line portion Dh of the non-mechanical valve(s).

10. A method as claimed in claim 9, wherein the diameter of the vertical line portion Dv and the diameter of the horizontal line portion Dh of the non-mechanical valve(s) are selected substantially identical.

11. A method as claimed in claim 1, wherein the control gas injection point upstream from the elbow is positioned at a distance x (difference between the height of the injection point in the vertical part and the lowest point of the non-mechanical valve) of the order of 1 to 5 times the diameter of the vertical line portion Dv.

12. A chemical looping combustion method as claimed in claim 1, wherein the solid active mass particles belong to group B of Geldart's classification.

13. A chemical looping combustion method as claimed in claim 1, wherein the solid active mass particles are metal oxides.

14. A chemical looping combustion method as claimed in claim 1, further comprising:
 exposing reduced solid particles of active mass to a material selected from the group consisting of hydrocarbon or water vapour for hydrogen production.

15. A chemical looping combustion method as claimed in claim 1, further comprising:
 partly oxidizing the hydrocarbon feed in the reduction reaction zone (i) to produce synthesis gas.

16. A chemical looping combustion method as claimed in claim 1, further comprising:
 recovering combustion heat from the zone selected from the group consisting of the oxidation reaction zone (i+1) and the reduction reaction zone (i).

\* \* \* \* \*